United States Patent
Bevilacqua et al.

[11] Patent Number: 6,026,137
[45] Date of Patent: Feb. 15, 2000

[54] CONTROL ROD GUIDE TUBE MOUNTING PIN

[75] Inventors: Bruce W. Bevilacqua, Westmoreland County; David E. Boyle, Armstrong County; James A. Rex, Westmoreland County, all of Pa.

[73] Assignee: Westinghouse Electric Corporation, Pittsburgh, Pa.

[21] Appl. No.: 08/909,005

[22] Filed: Aug. 8, 1997

Related U.S. Application Data

[60] Provisional application No. 60/023,630, Aug. 9, 1996.

[51] Int. Cl.[7] ................................................ G21C 19/00
[52] U.S. Cl. ........................................ 376/260; 376/353
[58] Field of Search ................................ 376/353, 364, 376/446, 260

[56] References Cited

U.S. PATENT DOCUMENTS

| | | | |
|---|---|---|---|
| 4,585,613 | 4/1986 | Styskal et al. | 376/260 |
| 4,702,880 | 10/1987 | Porowski et al. | 376/353 |
| 4,770,846 | 9/1988 | Land et al. | 376/353 |
| 4,772,448 | 9/1988 | Popalis et al. | 376/353 |
| 4,937,039 | 6/1990 | Balog et al. | 376/353 |
| 5,035,852 | 7/1991 | Land et al. | 376/353 |

*Primary Examiner*—Daniel D. Wasil

[57] ABSTRACT

A control rod guide tube mounting pin for engaging a hole in an upper core plate of a nuclear reactor pressure vessel has a resilient tubular portion with one or more axial crimps which flex allowing for resiliently fitting into a hole in an upper core plate without needing to enlarge or other machine the existing holes or drilling additional holes. Stainless steel mounting pins may be backfit into existing two pin mounting systems of control rod guide tubes adjacent to the outlet nozzles of the pressure vessels by removing the pins mounting the guide tubes adjacent the outlet nozzles to the upper core support plate; and then replacing the removed pins with stainless steel replacement pins.

5 Claims, 4 Drawing Sheets

6,026,137

CONTROL ROD GUIDE TUBE MOUNTING PIN

CROSS REFERENCE TO RELATED APPLICATIONS

This application claims the benefit of U.S. Provisional Application Ser. No. 60/023,630, filed Aug. 9, 1996.

TECHNICAL FIELD

The present invention relates to a mounting pin for mounting control rod guide tubes to the upper core plate in a nuclear reactor. More particularly, the present invention relates to a stainless steel mounting pin.

BACKGROUND OF THE INVENTION

Within a nuclear reactor, the upper boundary of the reactor core is defined by the upper core plate. The upper ends of the nuclear reactor core fuel assemblies are detachably mounted to the undersurface of the upper core plates. The core contains fuel assemblies including fuel rods within which nuclear fuel pellets are disposed. Each fuel assembly has a plurality of tubes which receive nuclear reactor control rods for controlling the power output of the fuel assemblies and the reactor core. Movement of the nuclear reactor control rods is accomplished by control rod drive mechanisms through control rod drive shafts that extend through the pressure vessel.

The nuclear reactor upper support plate is vertically spaced above the upper core plate. An upper plenum chamber is defined between the upper support plate and the upper core plate. Reactor core coolant in the form of water is conducted through the upper plenum chamber for subsequent flow through the reactor core coolant loop and heat exchange system which is external of the pressure vessel and core barrel. The nuclear reactor control rods may be disposed within the upper plenum chamber when they are withdrawn vertically upwardly out of the core; when the control rods are lowered into the core their respective drive shafts are disposed within the upper plenum chamber. Protection and guidance for the control rods and their drive rods within the upper plenum chamber is provided with respect to the cross-currents of the flowing nuclear reactor core coolant by guide tubes. The guide tubes are interposed between, and connected to, the upper surface of the upper core plate and the upper support plate. In an alternate design, a locking device crimps the nut to the shank of the mounting pin.

Annular flanges are provided at the lower ends of the guide tubes to secure the guide tubes to the upper core plate. Guide tube mounting pins position the guide tube flanges with respect to the upper core plate. The vertically disposed guide tube mounting pins have lower portions which are frictionally engaged within suitable bores defined within the upper core plate. The upper portion of each guide tube mounting pin is engaged with an internal hexagonal nut. Counterbored portions of the guide tube flange are engaged between a shoulder portion of the shank and the mated nut of the pin. A locking device such as a cap, dowel pin and the like are employed to prevent retrograde rotation of the nut relative to the mounting pin wherein the nut could become disengaged from the upper portion of the pin.

Since the inception of the rod cluster control assembly guide tube concept by Westinghouse Electric Corp. in the mid-1960s, the design objective has been to align the lower end of the guide tube to the upper core plate via two resilient guide tube mounting pins commonly referred to as "split pins". These split pins are attached to the guide tube lower flange and are engaged within circular holes in the upper core plate. Also, these split pins have leaves that compress as they enter the upper core plate holes and provide a spring compression load to give the lower end of the guide a degree of end fixity. This permits removal of the guide tube in the event of damage or excessive wear simply by unbolting the upper end where it is attached to the top support plate of the reactor internals and extracting it with a pull force sufficient to overcome the friction generated by the split pin leaf compression. See, e.g., U.S. Pat. No. 4,770,846 to Land et al. and U.S. Pat. No. 4,937,039 to Balog et al., and U.S. Pat. No. 5,035,852 to Land et al., all of which are incorporated by this reference for their description of the structure, installation and removal of split pins in standard holes of upper core plates in pressure vessels of pressurized water reactors.

The material originally chosen for the split pins was Inconel Alloy X-750 because of its high strength and superior mechanical properties and its good wear properties. The greater strength permits higher specified compressive loads in the leaves to achieve a higher degree of rigidity in the pinned end of the guide tube. In use, two split pins are provided in the lower flange of the guide tube and spaced 180 degrees apart to support the guide tube against the steady state loads and postulated accident loads and vibratory forces which could act on the guide tube during normal plant operation, as well as to resist upset or abnormal loads applied to the tube which could occur during postulated pipe break accidents or earthquake conditions. The axes of the two pins are opposed in direction so that each pin provides better restraint in a unique 90 degree opposed direction.

In the late 1970s, stress corrosion was observed in the Inconel Alloy X-750 pins of several nuclear plants. Significant time, money, and effort was spent arriving at a solution to the problem, which involved a revised solution heat treatment of the material and a reduced installation stress of the pin. By early 1988, approximately 60 nuclear facilities had the split pins removed and replaced with new Inconel X-750 split pins having advanced manufacturing and heat treating processes considered sufficient to produce pin longevity. More recent industry events have indicated that the replacement Inconel Alloy X-750 pins with the new design may also be susceptible to stress corrosion.

Clearly, there is a need for an improved guide tube mounting pin that is capable of bearing today's postulated loads (as an Inconel Alloy X-750 pin does) but which is not susceptible to stress corrosion. Such a pin should be rapidly and easily installable within a reactor core without major replacements to the upper internals and with minimum (and most desirably, no) machining operations so as to minimize both the cost of installation and the radiation exposure of the workers. Finally, it would be desirable if the pin were made from relatively inexpensive and easily fabricated material.

In the late 1980s, it was proposed to use stainless steel mounting pins to mount control rod guide tubes to upper core support plates having standard sized holes for receiving the mounting pins. U.S. Pat. No. 4,937,039 discloses that two pin mounting systems using 316 stainless steel replacement pins could be used with guide tubes remote from outlet nozzles but not for guide tubes adjacent to the outlet nozzles because two stainless steel pins were insufficient to satisfy upset or abnormal conditions. Thus, this patent discloses a four pin system using 316 stainless steel replacement mounting pins to support the guide tubes adjacent to the outlet nozzles. Undesirably, however, four pin systems require that two additional holes be drilled in the flanges and upper core support plates for each control rod guide tube adjacent the outlet nozzles in backfitting a reactor vessel. In the early 1990s, a few commercial nuclear reactors were redesigned to include new internals having two pin mounting systems, including enlarged holes (compared with standard sized holes) in the upper core support plates for receiving enlarged 316 stainless steel mounting pins for all of the guide tubes in the reactor vessels.

SUMMARY OF THE INVENTION

It is an object of the present invention to provide a stainless steel control rod guide tube mounting pin having the same geometry as the original Alloy X750 pins which may be used with any control rod guide tube mounting system in a reactor vessel. It is a further object of the present invention to provide a method of backfitting a nuclear reactor having standard sized holes in its upper core support plates for receiving mounting pins of a two pin mounting system for the control rod guide tubes adjacent the outlet nozzles of a nuclear reactor without having to enlarge or otherwise machine the standard sized holes.

With these objects in view, the present invention resides in a control rod guide tube mounting pin which has a resilient tubular portion for resiliently engaging a hole in an upper core plate. In a preferred embodiment, resiliency is provided by at least one axially directed crimp, and more preferably four axially directed crimps, which pinch together when the tubular portion is installed in a mounting hole of an upper core plate. Advantageously, the mounting pin can be fabricated of stainless steel and can be used to mount any control rod guide tube in a reactor vessel employing a traditional two pin mounting without needing to enlarge or otherwise machine the mounting holes or to add additional holes to the two pin mounting systems of existing commercial reactors. Thus, a nuclear reactor which may have employed standard sized Inconel Alloy X-750 mounting pins may be backfit by removing the mounting pins supporting the guide tubes adjacent the outlets of the reactor vessel and then replacing the original pins with stainless steel pins without changing the hole configurations or adding additional holes.

These and other objects, advantages and benefits of the present invention will be apparent from the following description of an exemplary embodiment thereof, reference being had to the accompanying drawings forming a pare hereof, wherein like reference numerals refer to like parts throughout.

DETAILED DESCRIPTION OF PREFERRED EMBODIMENTS

Figure 1:
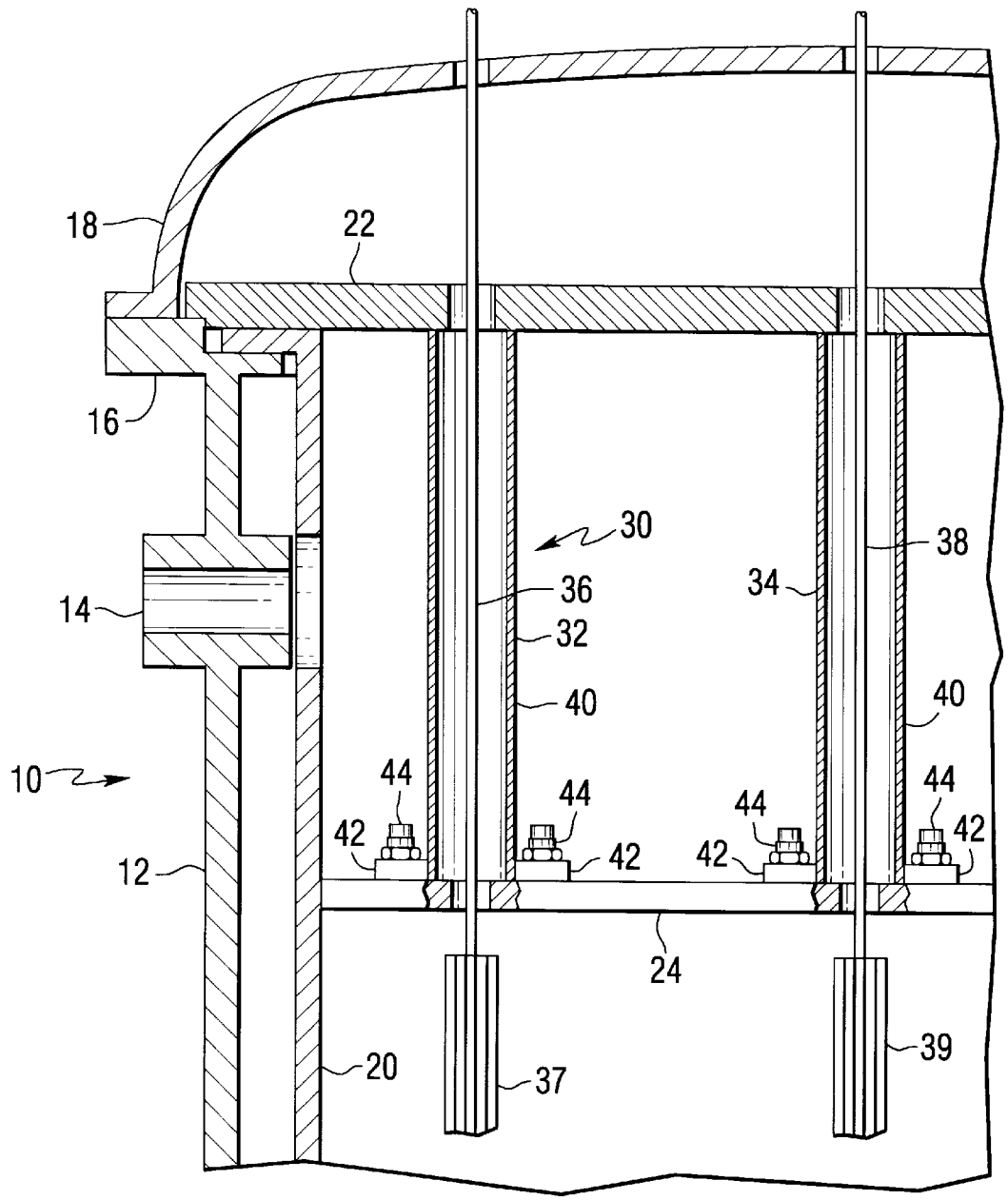
FIG. 1 is a fragmentary cross-sectional view of a nuclear reactor pressure vessel.

FIG. 1 generally shows a pressure vessel 10 such as would be employed in a commercial pressurized water nuclear reactor. The pressure vessel 10 has a sidewall 12 with at least one outlet nozzle 14 and a flange 16 on top thereof for removably supporting a top head 18. The flange 16 also supports a core barrel 20 and an upper support plate 22. The core barrel 20 in turn supports an upper core support plate 24. As is shown in FIG. 1 a plurality of control rod guide tubes 30, including guide tubes 32 adjacent the outlet nozzles 14 and guide tubes 34 away from the outlet nozzles extend from the upper support plate 22 to the upper core support plate 24 for guiding the control rod guide mechanisms 36 and 38 for raising and dropping control rod clusters 37 and 39. As employed in this description and the following claims of invention, the three or four control rod guide tubes in the row closest to the outlet nozzles 14 are considered as the "adjacent" tubes 32. The guide tubes 32 and 34 generally comprise a hollow tubular member 40 with a flange 42 which is removably mounted to the upper core support plate 24 by two mounting pins 44.

Figure 2:
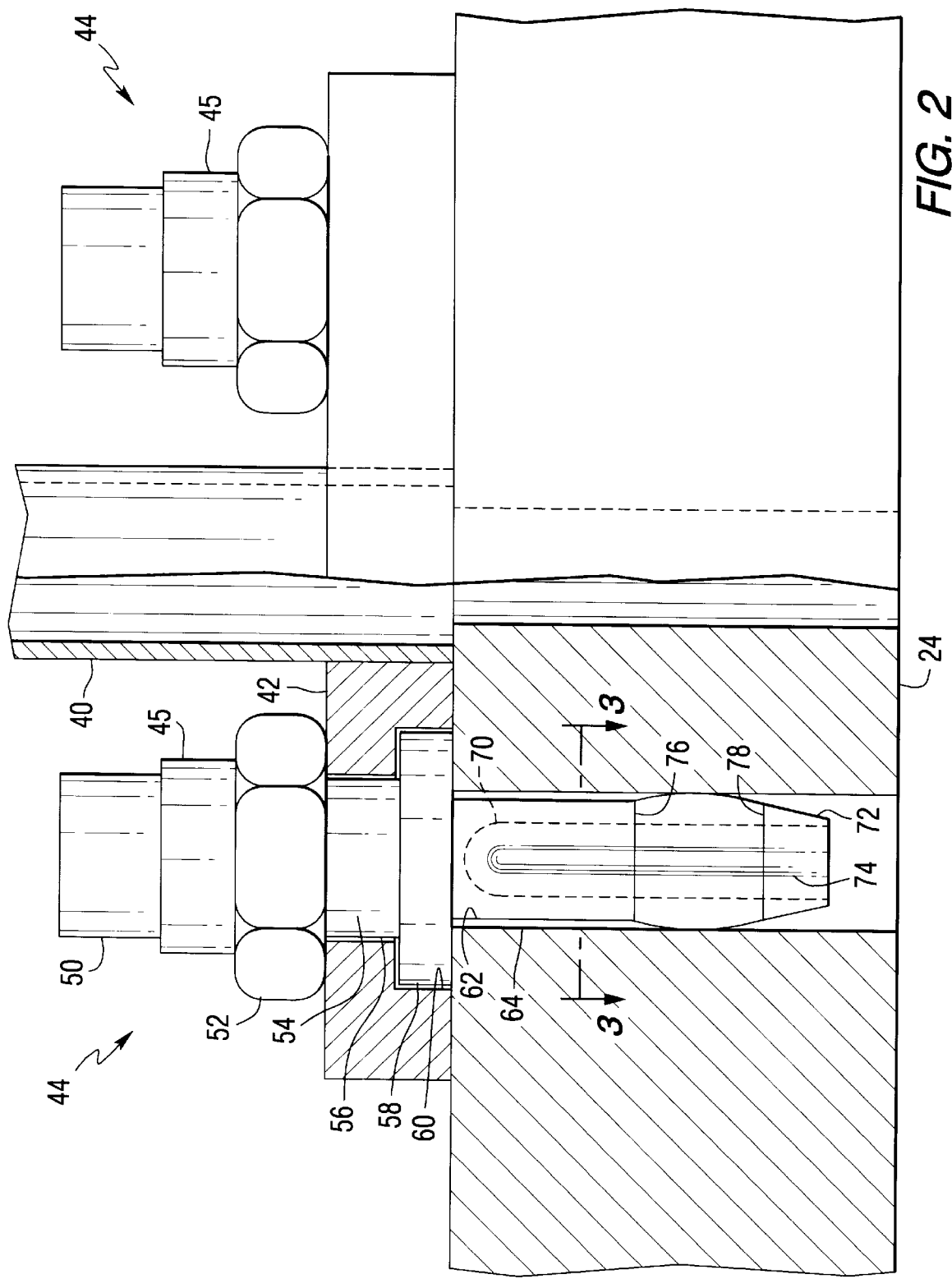
FIG. 2 is a fragmentary cross-sectional view of a control rod guide tube mounting pin embodying the present invention a nuclear reactor vessel.
Figure 3:
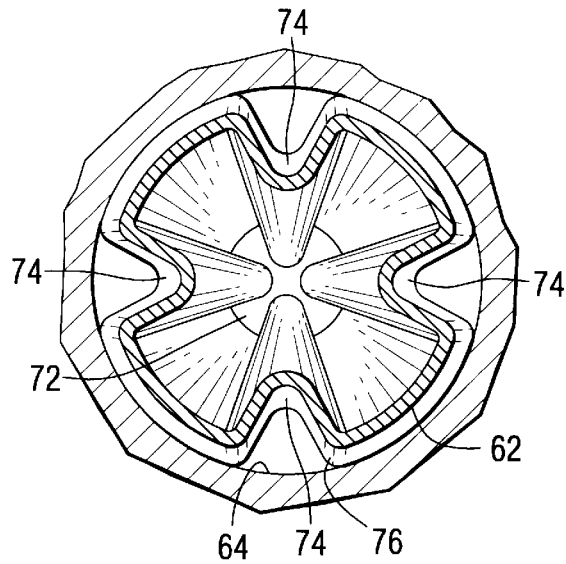
FIG. 3 is a cross-sectional view of the mounting pin shown in FIG. 2 taken along line 3—3.

As is best seen in FIGS. 2 and 3, the mounting pin 44 of the present invention has a top portion 50 which engages a locking nut 52 and a double crimp cap such as the cap shown by U.S. Pat. No. 4,770,846 or other nut locking device; a central portion 54 including a shank 56 with a shoulder 58 which is received in a hole 60 of the guide tube flange 42; and a lower tubular resilient portion 62 which is removably received in a hole 64 in the upper core support plate 24. Advantageously, the pin 44 is fabricated of a stainless steel alloy and exhibits substantially the same properties as the upper core support plate 24. Preferably, the pin 44 is fabricated of an austenitic stainless steel such as an AISI 316 composition. Thus, the pin 44 may have a composition of about 16–18% chromium, 10–15% nickel, 2–3% molybdenum, up to 2% manganese, up to 1% silicon, up to 0.045% phosphorous, up to 0.02% sulfur and up to about 0.08% carbon. In a preferred embodiment, the composition is a 316L composition having no more than 0.03% carbon. Also, the pin 44 is preferably retains at least some of its cold working. In other embodiments, stainless steel compositions such as SM-19 (nominally having 0.06% carbon, 12.5% nickel, 21.5% chromium, 2.5% molybdenum, 0.2% vanadium and 0.2% niobium) Armco's Nitronic 50 and Nitronic 60 may be employed.

Figure 4:
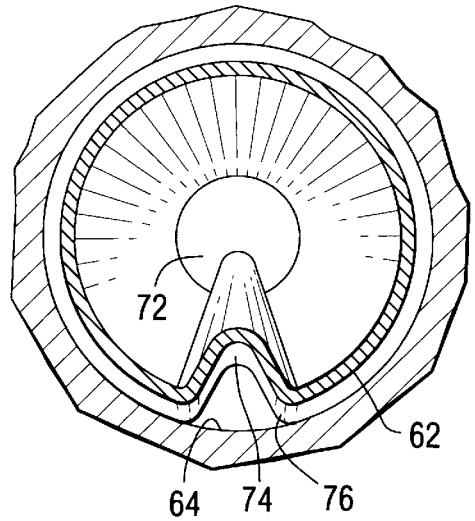
FIG. 4 is cross-sectional view of a second embodiment of the mounting pin shown in FIG. 2 taken along line 3—3.
Figure 5:
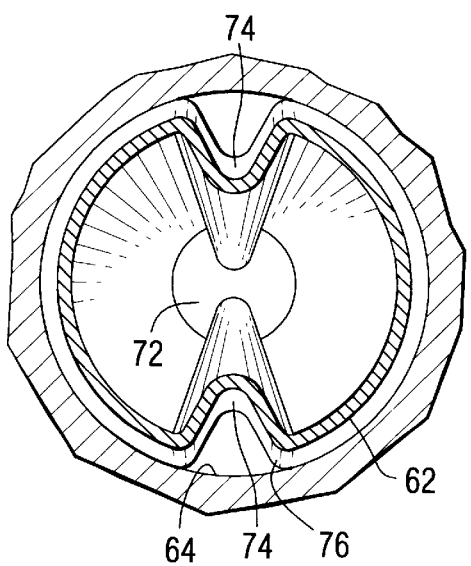
FIG. 5 is cross-sectional view of a third embodiment of the mounting pin shown in FIG. 2 taken along line 3—3.
Figure 6:
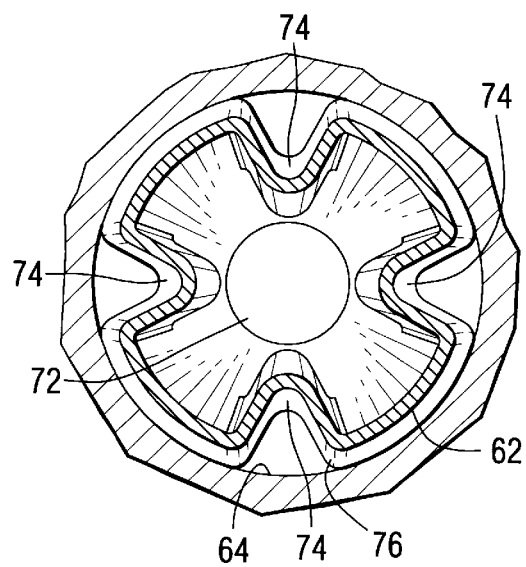
FIG. 6 is a cross-sectional view of a fourth embodiment of the mounting pin shown in FIG. 2 taken along line 3—3.

The lower tubular portion 62 is hollow as is indicated by the inner wall 70 and has a tapered distal open end portion 72 which begins to taper at approximately two thirds the length of the tubular portion 62 for facilitating entry into a hole 64 in the upper core support plate 24. Before the beginning of the taper, the tubular portion 62 has an enlarged circumferential section extending from circumferential line 76 to circumferential line 78 for providing an interference fit with the upper core support plate 24. There is no interference above circumferential line 76 in the installation process, which is illustrated as an exaggerated clearance on FIG. 2. The lower tubular portion 62 has at least one axially extending crimp 74 for providing resiliency to the pin 44 by flexing or pinching together when the pin 44 is installed into the hole 64. As is shown in FIG. 3, the tubular portion 62 preferably has at least two and, most preferably, four crimps 74 which would be disposed at about 90 degrees to each other. FIG. 4 illustrates an embodiment of a mounting pin 44 having one axially extending crimp 74 in the tubular portion 62. FIG. 5 illustrates an embodiment of a mounting pin 44 having two axially extending crimps 74 arranged at about 180 degrees to each other. FIG. 6 illustrates an embodiment of a mounting pin 44 wherein the axially extending crimps extend to or just below the lower circumferential line 78 rather than to the distal open end 72.

Figure 7:
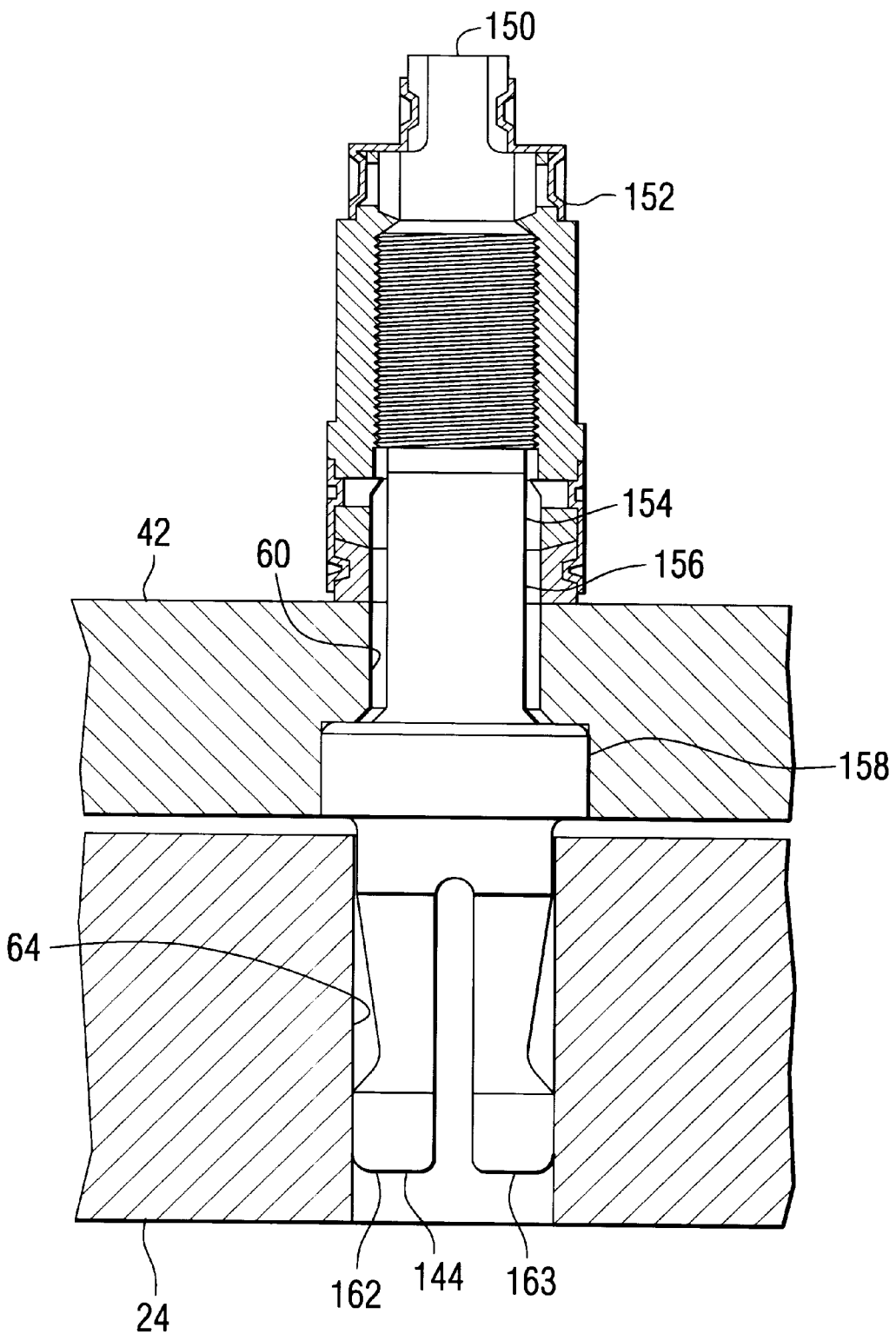
FIG. 7 is a cross sectional view of a fourth embodiment of a mounting pin similar to the view of FIG. 2.

FIG. 7 shows a preferred embodiment wherein a mounting pin 144 has an upper portion 150 engaged with a locking nut 152; a central portion 154 including a shank 156 with a shoulder 158 received in a hole 60 of a guide tube flange 42; and a lower split resilient portion 162 comprised of two tapered leaves 163 in hole 60 of an upper core plate 24. Certain advantages of this design are discussed in detail in U.S. Pat. No. 5,035,852. In addition, the mounting pin 144 is preferably fabricated of an austenitic stainless steel such as an AISI 316 composition.

Advantageously, it has been found that a standard size stainless steel structure will provide sufficient force to resist upsetting and abnormal forces on the guide tubes adjacent the outlet nozzles as well as the other guide tubes. Thus, a nuclear reactor may be backfit by removing the Inconel Alloy X-750 mounting pins from the guide tubes and replacing them with standard size stainless steel guide tubes without having to enlarge or otherwise machine the standard sized holes in the upper core support plate. As the above referenced U.S. Pat. No. 4,937,039 discloses, the mounting pins can be replaced using underwater tooling techniques.

The features and advantages of the present invention being apparent from the foregoing detailed specification, it is intended by the following claims of invention to cover all such features and advantages which fall within the spirit and scope of the invention. Further, since numerous modifications and changes will readily occur to those skilled in the art from the foregoing specification of this invention, it is not desired to limit the invention to the exact construction and operation illustrated and described. Accordingly, suitable modifications and equivalents may be resorted to which fall within the scope and spirit of the invention.

What is claimed is:

1. A method of backfitting a nuclear reactor having at least one outlet nozzle, an upper core support plate defining two mounting pin holes having a hole geometry and control rod guide tubes adjacent the outlet nozzle, each guide tube mounted to the upper core support plate by a two pin mounting system having two pins extending into the upper core support plate holes having a geometry, comprising the steps of:

removing the two mounting pins in the two pin mounting system supporting the guide tube adjacent the outlet nozzle; and replacing the two mounting pins with no more than two austenitic stainless steel mounting pins, the replacement pins extending into the two holes with the same hole geometry in the two pin mounting system for supporting the guide tube adjacent the outlet nozzle whereby the control rod guide tubes adjacent the outlet nozzle of the backfitted reactor vessel may be supported by two replacement pins without enlarging or drilling additional holes in the upper core plate.

2. The method of claim 1, including the step of: providing austenitic stainless steel mounting pins having resilient tubular portions for extending into the same geometry holes of a two pin system supporting guide tubes adjacent the outlet nozzle of the reactor vessel.

3. The method of claim 2, wherein the austenitic stainless steel mounting pins resiliently extend into the core plate two pin system supporting guide tubes adjacent the outlet nozzle of the reactor vessel by crimping the tubular portions into the same geometry holes.

4. The method of claim 1, including the step of: providing austenitic stainless steel mounting pins having two resilient leaves for extending into the same geometry holes of a two pin system supporting guide tubes adjacent the outlet nozzle of the reactor vessel.

5. The method of claim 1, wherein Inconel Alloy X-750 mounting pins are removed from a two pin system supporting a guide tube adjacent the outlet nozzle of the reactor vessel.

* * * * *